United States Patent
Inada (10) Patent No.: US 9,680,598 B2
(45) Date of Patent: Jun. 13, 2017

(54) WAVELENGTH DIVISION MULTIPLEXING OPTICAL TRANSMISSION APPARATUS AND WAVELENGTH DIVISION MULTIPLEXING OPTICAL TRANSMISSION METHOD

(71) Applicant: NEC Corporation, Tokyo (JP)

(72) Inventor: Yoshihisa Inada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/770,197

(22) PCT Filed: Oct. 18, 2013

(86) PCT No.: PCT/JP2013/006195
§ 371 (c)(1),
(2) Date: Aug. 25, 2015

(87) PCT Pub. No.: WO2014/132305
PCT Pub. Date: Sep. 4, 2014

(65) Prior Publication Data
US 2016/0006537 A1    Jan. 7, 2016

(30) Foreign Application Priority Data
Feb. 26, 2013   (JP) .................................. 2013-035456

(51) Int. Cl.
*H04J 14/06*        (2006.01)
*H04J 14/02*        (2006.01)
(Continued)

(52) U.S. Cl.
CPC .......... *H04J 14/06* (2013.01); *H04B 10/5161* (2013.01); *H04B 10/532* (2013.01); *H04B 10/541* (2013.01); *H04J 14/02* (2013.01)

(58) Field of Classification Search
CPC ....... H04J 14/06; H04J 14/02–14/0298; H04B 10/532
See application file for complete search history.

(56) References Cited

U.S. PATENT DOCUMENTS 5,841,557 A * 11/1998 Otsuka ............... H04B 10/2557
                                                    398/152
6,427,043 B1    7/2002 Naito
(Continued)

FOREIGN PATENT DOCUMENTS

CN      102707385 A    10/2012
EP      2 169 851 A2    3/2010
(Continued)

OTHER PUBLICATIONS

J. Renaudier et al., "Experimental comparison of 28Gbaud Polarization Switched- and Polarization Division Multiplexed-QPSK in WDM Long-Haul Transmission System", 2011 37$^{th}$ European Conference and Exhibition on Optical Communication (ECOC), IEEE, pp. 1-3, Sep. 2011.

(Continued)

*Primary Examiner* — Nathan Curs
(74) *Attorney, Agent, or Firm* — Finnegan, Henderson, Farabow, Garrett & Dunner, L.L.P.

(57) ABSTRACT

A wavelength division multiplexing optical transmission apparatus includes a plurality of polarization multiplexing optical modulation means, polarization-maintaining optical multiplexing means, and delay adjustment means. The polarization multiplexing optical modulation means generate a plurality of polarization multiplexed optical modulation signals having different wavelengths. The polarization-maintaining optical multiplexing means multiplexes the wavelengths of the polarization multiplexed optical modulation signals to generate a wavelength multiplexed optical signal (WDM). The delay adjustment means adjusts a delay such that light intensities of polarization multiplexed optical modulation signals having adjacent wavelengths in the wavelength multiplexed optical signal (WDM) vary inversely with respect to each other.

4 Claims, 10 Drawing Sheets

(51) Int. Cl.
  *H04B 10/532* (2013.01)
  *H04B 10/516* (2013.01)
  *H04B 10/54* (2013.01)

(56) References Cited

U.S. PATENT DOCUMENTS

| | | | |
|---|---|---|---|
| 6,920,261 B2 | 7/2005 | Inada et al. | |
| 2002/0071155 A1 | 6/2002 | Inada et al. | |
| 2003/0090768 A1* | 5/2003 | Liu | H04B 10/2557 398/185 |
| 2003/0189745 A1 | 10/2003 | Kikuchi et al. | |
| 2005/0111849 A1* | 5/2005 | Merlaud | H04J 14/02 398/152 |
| 2007/0122153 A1* | 5/2007 | Tamai | H04J 14/005 398/77 |
| 2008/0075463 A1 | 3/2008 | Nakamoto | |
| 2010/0034537 A1 | 2/2010 | Zhang et al. | |
| 2011/0293276 A1* | 12/2011 | Takahara | H04B 10/5053 398/65 |
| 2012/0287949 A1* | 11/2012 | Webb | H04B 10/5162 370/536 |

FOREIGN PATENT DOCUMENTS

| | | |
|---|---|---|
| JP | 7-66779 | 3/1995 |
| JP | 2002-185402 | 6/2002 |
| JP | 2003-298525 | 10/2003 |
| JP | 2008-244514 | 10/2008 |
| JP | 2009-159054 | 7/2009 |
| JP | 2011-223185 | 11/2011 |
| JP | 2011-530885 | 12/2011 |
| JP | 2012-220893 | 11/2012 |
| WO | WO 2008/038337 A1 | 4/2008 |
| WO | WO 2009/013795 A1 | 1/2009 |

OTHER PUBLICATIONS

Notification of Reasons for Refusal issued on Aug. 30, 2016, by the Japanese Patent Office in counterpart Japanese Patent Application No. 2015-502581.

G. Bellotti et al., "Cross-Phase Modulation Suppressor for Multispan Dispersion-Managed WDM Transmissions", IEEE Photonics Technology Letters, vol. 12, No. 6, pp. 726-728, Jun. 2000.

Office Action issued on Sep. 5, 2016, by the Chinese Patent Office in counterpart Chinese Patent Application No. 201380073838.7.

C. Xie et al., "Suppression of Intrachannel Nonlinear Effects With Alternate-Polarization Formats", Journal of Lightwave Technology, IEEE Service Center, vol. 22, No. 3, pp. 806-812, Mar. 2004.

Extended European Search Report mailed Oct. 17, 2016, by the European Patent Office in counterpart European Patent Application No. 13876197.8.

International Search Report mailed Dec. 24, 2013 in corresponding PCT International Application.

* cited by examiner

WAVELENGTH DIVISION MULTIPLEXING OPTICAL TRANSMISSION APPARATUS AND WAVELENGTH DIVISION MULTIPLEXING OPTICAL TRANSMISSION METHOD

CROSS-REFERENCE TO RELATED PATENT APPLICATIONS

This application is a National Stage Entry of International Application No. PCT/JP2013/006195, filed Oct. 18, 2013, which claims priority from Japanese Patent Application No. 2013-035456, filed Feb. 26, 2013. The entire contents of the above-referenced applications are expressly incorporated herein by reference.

TECHNICAL FIELD

The present invention relates to a wavelength division multiplexing optical transmission apparatus and a wavelength division multiplexing optical transmission method.

BACKGROUND ART

In optical fiber transmission systems, polarization multiplexing for performing signal multiplexing by utilizing polarization has been put into practical use. The use of polarization multiplexing can double the transmission capacity per fiber. Digital signal processing techniques have been recently adopted for reception units of optical transceivers, which makes it possible to effectively split polarization multiplexed optical signals.

In order to meet an increasing demand for communication traffic in the future, it is important to increase the transmission capacity by multiplexing polarization multiplexed optical signals at narrow wavelength intervals by dense wavelength division multiplexing. A wavelength multiplex transmission system that multiplexes and transmits a plurality of optical signals having different wavelengths within one optical fiber has a problem of cross-phase modulation (XPM) which is a non-linear effect in optical fibers. In the cross-phase modulation, an optical signal having a certain wavelength affects an optical signal having another wavelength, which results in deterioration of the transmission signal quality. In order to achieve an excellent transmission signal quality in the wavelength multiplex transmission system, it is important to reduce the influence of the cross-phase modulation.

For example, Patent Literature 1 discloses an optical wavelength multiplex transmission system capable of reducing waveform distortions due to the effect of cross-phase modulation in the optical wavelength multiplex transmission system employing an intensity modulation/direct detection (IM/DD) scheme. In this optical wavelength multiplex transmission system, different wavelengths of optical signals that are modulated by NRZ (Non Return to Zero) code are set in such a manner that bit patterns delivered from a plurality of optical transmitters that deliver the optical signals cause walkoff (difference in propagation distance) of ½ bits or more within the effective length of an optical fiber.

On the other hand, Patent Literature 2 discloses a polarization fluctuation compensation device that compensates for the effect due to cross-phase modulation to achieve an excellent reception characteristic. Patent Literature 3 discloses an optical field receiver suitable for receiving optical multilevel information transmitted through an optical fiber.

CITATION LIST

Patent Literature

[Patent Literature 1] Japanese Unexamined Patent Application Publication No. H07-66779
[Patent Literature 2] Japanese Unexamined Patent Application Publication No. 2011-223185
[Patent Literature 3] International Patent Publication No. WO 2008/038337

SUMMARY OF INVENTION

Technical Problem

As described above, waveform distortions due to the cross-phase modulation effect can be reduced by setting different wavelengths of optical signals in such a manner that bit patterns delivered from a plurality of optical transmitters that deliver the optical signals cause walkoff of ½ bits or more within the effective length of an optical fiber. However, in this method, the range of options for wavelengths is narrow, which is disadvantageous with regard to increasing the density of wavelength multiplexed optical signals.

The present invention has been made to solve the above-mentioned problem, and an object of the present invention is to provide a wavelength division multiplexing optical transmission apparatus and a wavelength division multiplexing optical transmission method which are capable of reducing the transmission quality deterioration of polarization multiplexed optical signals generated in an optical fiber transmission line, and are suitable for dense wavelength division multiplexing.

Solution to Problem

A wavelength division multiplexing optical transmission apparatus according to a first exemplary aspect of the present invention includes a plurality of polarization multiplexing optical modulation means, polarization-maintaining optical multiplexing means, and delay adjustment means. The plurality of polarization multiplexing optical modulation means generate a plurality of polarization multiplexed optical modulation signals having different wavelengths. The polarization-maintaining optical multiplexing means multiplexes the wavelengths of the plurality of polarization multiplexed optical modulation signals to generate a wavelength multiplexed optical signal. The delay adjustment means adjusts a delay in such a manner that light intensities of polarization multiplexed optical modulation signals having adjacent wavelengths in the wavelength multiplexed optical signal vary inversely with respect to each other.

A wavelength division multiplexing optical transmission method according to a second exemplary aspect of the present invention includes: generating a plurality of polarization multiplexed optical modulation signals having different wavelengths; generating a wavelength multiplexed optical signal by multiplexing the plurality of polarization multiplexed optical modulation signals; and adjusting a delay in such a manner that light intensities of polarization multiplexed optical modulation signals having adjacent wavelengths in the wavelength multiplexed optical signal vary inversely with respect to each other.

Advantageous Effects of Invention

According to the present invention, it is possible to provide a wavelength division multiplexing optical transmission apparatus and a wavelength division multiplexing optical transmission method which are capable of reducing the transmission quality deterioration of polarization multiplexed optical signals generated in an optical fiber transmission line, and are suitable for dense wavelength division multiplexing.

DESCRIPTION OF EMBODIMENTS

First Exemplary Embodiment

Exemplary embodiments of the present invention will be described below with reference to the drawings.

First, a wavelength division multiplexing optical transmission apparatus and a wavelength division multiplexing optical transmission method according to a first exemplary embodiment will be described.

Figure 1:
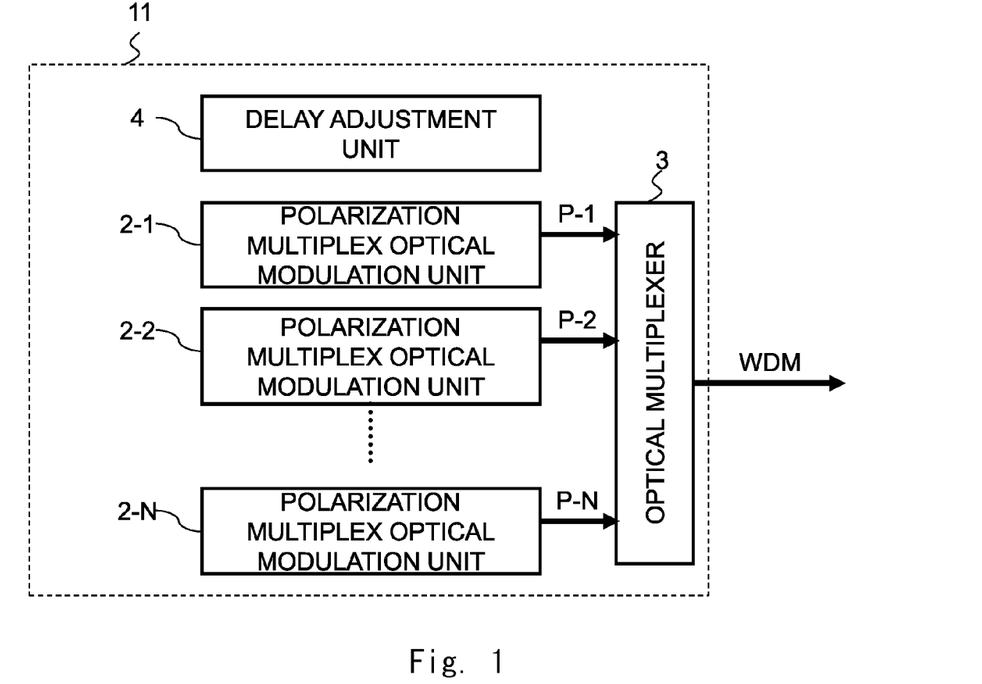
FIG. 1 is a block diagram showing a wavelength division multiplexing optical transmission apparatus according to a first exemplary embodiment.

Referring to FIG. 1, a wavelength division multiplexing optical transmission apparatus 11 according to the first exemplary embodiment includes polarization multiplexed optical modulation units 2-1 to 2-N, a polarization-maintaining optical multiplexing unit 3, and a delay adjustment unit 4. The polarization multiplexed optical modulation units 2-1 to 2-N generate polarization multiplexed optical modulation signals P-1 to P-N, respectively. The polarization multiplexed optical modulation signals P-1 to P-N have different wavelengths. The wavelengths of the polarization multiplexed optical modulation signals P-1 to P-N are represented by $\lambda_1$ to $\lambda_N$, respectively. In this case, the greater a value of a subscript to the right of $\lambda$ is, the longer a wavelength is. The polarization-maintaining optical multiplexing unit 3 multiplexes the wavelengths of the polarization multiplexed optical modulation signals P-1 to P-N to generate a wavelength multiplexed optical signal WDM. The wavelength division multiplexing optical transmission apparatus 11 outputs the wavelength multiplexed optical signal WDM to an optical fiber transmission line (not shown). The delay adjustment unit 4 adjusts a delay in such a manner that signal intensities of signals having adjacent wavelengths among the polarization multiplexed optical modulation signals P-1 to P-N in the wavelength multiplexed optical signal WDM vary inversely with respect to each other.

Figure 2:
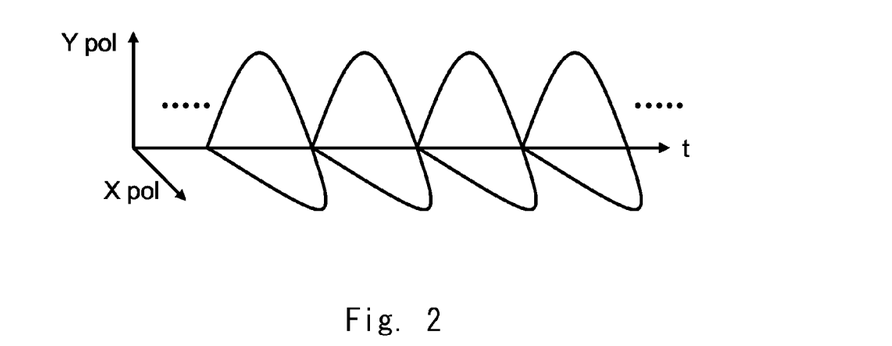
FIG. 2 is a conceptual diagram showing a state of a polarization multiplexed optical modulation signal of a polarization bit alignment system.

Referring to FIG. 2, the polarization multiplexed optical modulation signals P-1 to P-N in the wavelength multiplexed optical signal WDM are, for example, polarization multiplexed optical modulation signals of a polarization bit alignment system. In the polarization multiplexed optical modulation signals of the polarization bit alignment system, the time waveform of X-polarization and the time waveform of Y-polarization are uniform.

Figure 3:
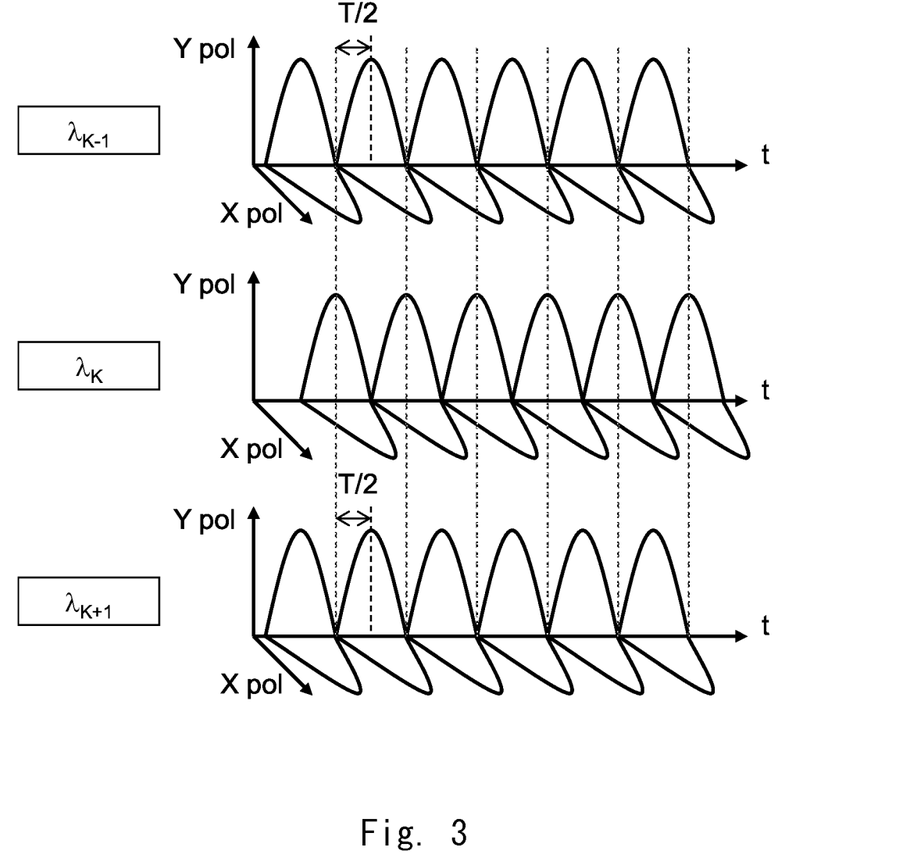
FIG. 3 is a conceptual diagram showing examples of the state of the polarization multiplexed optical modulation signal in a wavelength multiplexed optical signal output from the wavelength division multiplexing optical transmission apparatus according to the first exemplary embodiment.

Referring to FIG. 3, the states of the polarization multiplexed optical modulation signals P-1 to P-N in the wavelength multiplexed optical signal WDM output from the wavelength division multiplexing optical transmission apparatus 11 in the case where the polarization multiplexed optical modulation signals P-1 to P-N are polarization multiplexed optical modulation signals of the polarization bit alignment system will be described. For ease of explanation, FIG. 3 shows time waveforms of polarization multiplexed optical modulation signals P-(K−1), P-K, and P-(K+1) of three adjacent wavelengths ((K−1)-th wavelength $\lambda_{K-1}$, K-th wavelength $\lambda_K$, and (K+1)-th wavelength $\lambda_{K+1}$, which are in an ascending order). The light intensity of the polarization multiplexed optical modulation signal P-(K−1) having the wavelength $\lambda_{K-1}$ varies inversely with respect to the light intensity of the polarization multiplexed optical modulation signal P-K having the wavelength $\lambda_K$ adjacent to the wavelength $\lambda_{K-1}$. The light intensity of the polarization multiplexed optical modulation signal P-K having the wavelength $\lambda_K$ varies inversely with respect to the light intensity of the polarization multiplexed optical modulation signal P-(K+1) having the wavelength $\lambda_{K+1}$ adjacent to the wavelength $\lambda_K$. Specifically, when the optical power level of the polarization multiplexed optical modulation signal P-K having the wavelength $\lambda_K$ is a maximum, the optical power level of each of the polarization multiplexed optical modulation signals P-(K−1) and P-(K+1) having the wavelengths $\lambda_{K-1}$ and $\lambda_{K+1}$, respectively, which are adjacent to the wavelength $\lambda_K$, is a minimum. When the optical power level of the polarization multiplexed optical modulation signal P-K is a minimum, the optical power level of each of the polarization multiplexed optical modulation signals P-(K−1) and P-(K+1) is maximum.

Incidentally, one of the main factors causing deterioration of the signal quality in an optical fiber transmission system is cross-phase modulation (XPM). In the cross-phase modulation, a variation in the light intensity of an optical signal having a certain wavelength causes phase modulation of an optical signal having another wavelength due to a non-linear Kerr effect. The influence of the cross-phase modulation increases as the wavelength interval becomes smaller.

Therefore, as described above, the time waveforms are adjusted in such a manner that the light intensities of signals having adjacent wavelengths among the polarization multiplexed optical modulation signals P-1 to P-N in the wavelength multiplexed optical signal WDM vary inversely with respect to each other, thereby making it possible to reduce the influence of the cross-phase modulation in the optical fiber transmission line and to reduce waveform distortions due to the cross-phase modulation. Consequently, the transmission quality deterioration of the polarization multiplexed optical modulation signals P-1 to P-N generated in the optical fiber transmission line can be reduced.

Further, the wavelengths $\lambda_1$ to $\lambda_N$ of the polarization multiplexed optical modulation signals P-1 to P-N are not limited by the adjustment of a delay in such a manner that the light intensities of signals having adjacent wavelengths among the polarization multiplexed optical modulation signals P-1 to P-N in the wavelength multiplexed optical signal WDM vary inversely with respect to each other. Accordingly, this exemplary embodiment is suitable for dense wavelength division multiplexing to increase the transmission capacity by multiplexing the polarization multiplexed optical signals at narrow wavelength intervals.

The adjustment of a delay in such a manner that the light intensities of polarization multiplexed optical modulation signals having adjacent wavelengths vary inversely with respect to each other can be achieved by imparting a time shift (delay time difference) of T/2 bits between signals having adjacent wavelengths among the polarization multiplexed optical modulation signals P-1 to P-N in the wavelength multiplexed optical signal WDM (for example, between the polarization multiplexed optical modulation signals P-(K−1) and P-K, and between the polarization multiplexed optical modulation signals P-K and P-(K+1)). In this case, T represents a one-bit time slot at a symbol rate. More specifically, a time shift of T/2 bits is imparted between a polarization multiplexed optical modulation signal group (polarization multiplexed optical modulation signals P-1, P-3, and . . . ) having odd-numbered wavelengths and a polarization multiplexed optical modulation signal group (polarization multiplexed optical modulation signals P-2, P-4, and . . . ) having even-numbered wavelengths, counted in an ascending order of the polarization multiplexed optical modulation signals P-1 to P-N in the wavelength multiplexed optical signal WDM. In this case, as shown in FIG. 3, the time waveform of the polarization multiplexed optical modulation signal P-K having the wavelength $\lambda_K$ is shifted by T/2 bits with respect to the time waveforms of the polarization multiplexed optical modulation signals P-(K−1) and P-(K+1) having the wavelengths $\lambda_{K-1}$ and $\lambda_{K+1}$, respectively, which are adjacent to the wavelength $\lambda_K$.

When a time shift of T/2 bits is imparted between the polarization multiplexed optical modulation signal group having odd-numbered wavelengths and the polarization multiplexed optical modulation signal group having even-numbered wavelengths, counted in an ascending order of the polarization multiplexed optical modulation signals P-1 to P-N in the wavelength multiplexed optical signal WDM, peaks of the optical signal levels have the same phase in the polarization multiplexed optical modulation signal group having odd-numbered (or even-numbered) wavelengths. Since the intervals between the wavelengths of the signals included in the polarization multiplexed optical modulation signal group having odd-numbered (or even-numbered) wavelengths are large, the influence of the cross-phase modulation in the polarization multiplexed optical modulation signal group having odd-numbered (or even-numbered) wavelengths is negligibly small.

Next, a case where the polarization multiplexed optical modulation signals P-1 to P-N in the wavelength multiplexed optical signal WDM are polarization multiplexed optical modulation signals of a polarization bit interleaving system will be described. In this case, the delay adjustment unit 4 adjusts a delay in such a manner that the polarization multiplexed optical modulation signals P-1 to P-N in the wavelength multiplexed optical signal WDM become polarization multiplexed optical modulation signals of the polarization bit interleaving system and the light intensities of components having the same polarization plane of the signals having adjacent wavelengths among the polarization multiplexed optical modulation signals P-1 to P-N in the wavelength multiplexed optical signal WDM vary inversely with respect to each other.

Figure 4:
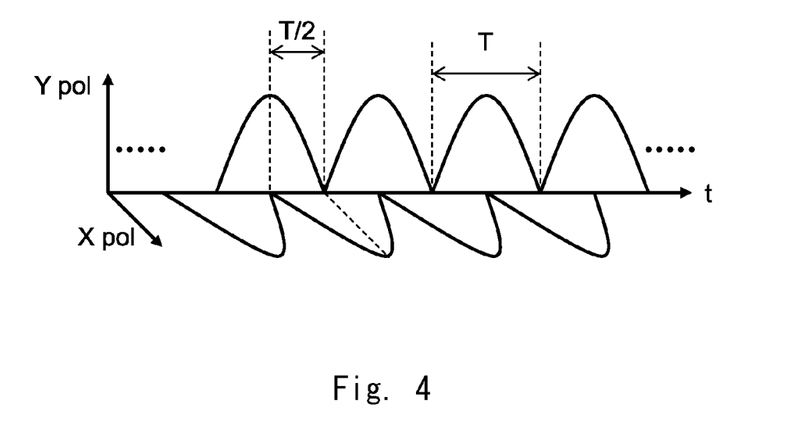
FIG. 4 is a conceptual diagram showing a state of a polarization multiplexed optical modulation signal of a polarization bit interleaving system.

Referring to FIG. 4, in the polarization multiplexed optical modulation signals of the polarization bit interleaving system, the time waveform of X-polarization and the time waveform of Y-polarization are offset by T/2 bits. The use of the polarization multiplexed optical modulation signals of the polarization bit interleaving system makes it possible to reduce the cross-polarization phase modulation (Xpol-PM) in the optical fiber transmission line and to improve the transmission characteristics of the polarization multiplexed optical modulation signals P-1 to P-N.

Figure 5:
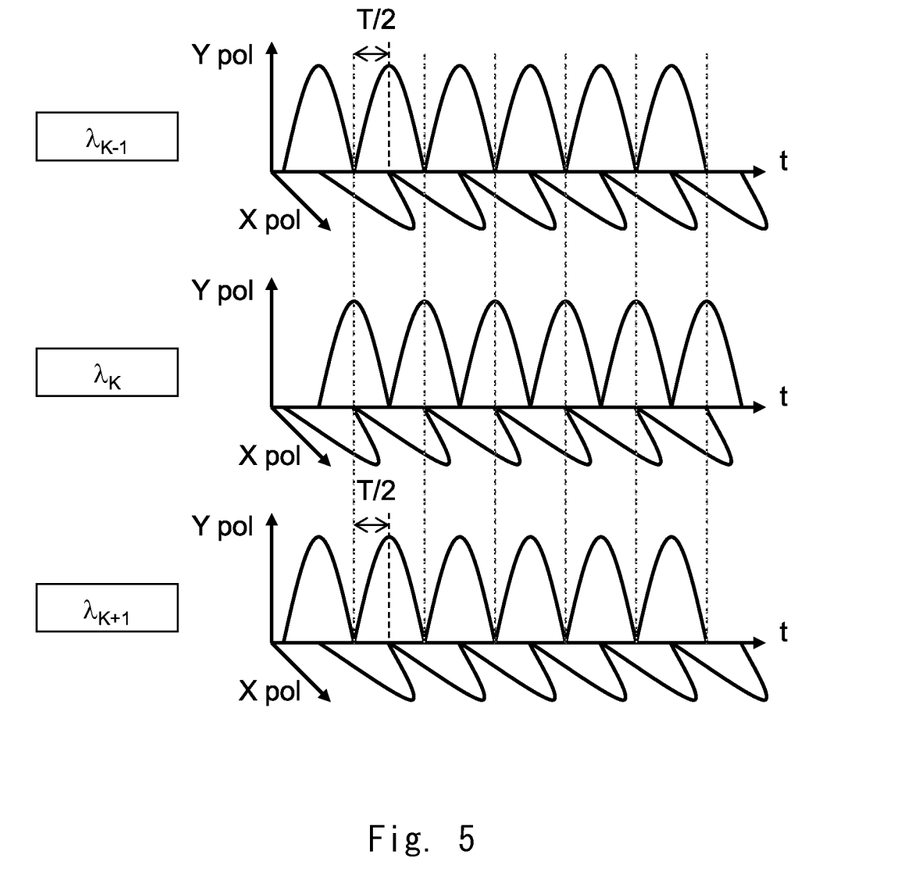
FIG. 5 is a conceptual diagram showing other examples of the state of the polarization multiplexed optical modulation signal in the wavelength multiplexed optical signal output from the wavelength division multiplexing optical transmission apparatus according to the first exemplary embodiment.

Referring to FIG. 5, the states of the polarization multiplexed optical modulation signals P-1 to P-N in the wavelength multiplexed optical signal WDM output from the wavelength division multiplexing optical transmission apparatus 11 in the case where the polarization multiplexed optical modulation signals P-1 to P-N are polarization multiplexed optical modulation signals of the polarization bit interleaving system will be described. For ease of explanation, FIG. 5 shows time waveforms of the polarization multiplexed optical modulation signals P-(K−1), P-K, and P-(K+1) having three adjacent wavelengths (wavelength $\lambda_{K-1}$, wavelength $\lambda_K$, and wavelength $\lambda_{K+1}$). In each of the polarization multiplexed optical modulation signals P-(K−1), P-K, and P-(K+1), the time waveform of X-polarization and the time waveform of Y-polarization are shifted from each other by T/2 bits. Further, the Y-polarization of the polarization multiplexed optical modulation signal P-(K−1) having the wavelength $\lambda_{K-1}$ and the Y-polarization of the polarization multiplexed optical modulation signal P-K having the wavelength $\lambda_K$ adjacent to the wavelength $\lambda_{K-1}$ show the time waveforms that are shifted from each other by T/2 bits, and the light intensities thereof vary inversely with respect to each other. The Y-polarization of the polarization multiplexed optical modulation signal P-K having the wavelength $\lambda_K$ and the Y-polarization of the polarization multiplexed optical modulation signal P-(K+1) having the wavelength $\lambda_{K+1}$ adjacent to the wavelength $\lambda_K$ show the time waveforms that are shifted from each other by T/2 bits, and the light intensities thereof vary inversely with respect to each other.

By achieving the state of the wavelength multiplexed optical signal WDM as shown in FIG. 5, the influence of the cross-polarization phase modulation in each of the polarization multiplexed optical modulation signals P-1 to P-N can be suppressed and the influence of the cross-phase modulation between signals having adjacent wavelengths among the polarization multiplexed optical modulation signals P-1 to P-N can be reduced. Accordingly, the transmission quality deterioration of the polarization multiplexed optical modulation signals P-1 to P-N generated in the optical fiber transmission line can be further reduced.

Second Exemplary Embodiment

Next, a wavelength division multiplexing optical transmission apparatus and a wavelength division multiplexing optical transmission method according to a second exemplary embodiment will be described. Hereinafter, features of the second exemplary embodiment that are common to those of the first exemplary embodiment and features of the second exemplary embodiment that are obvious from the first exemplary embodiment will be omitted as necessary.

Figure 6:
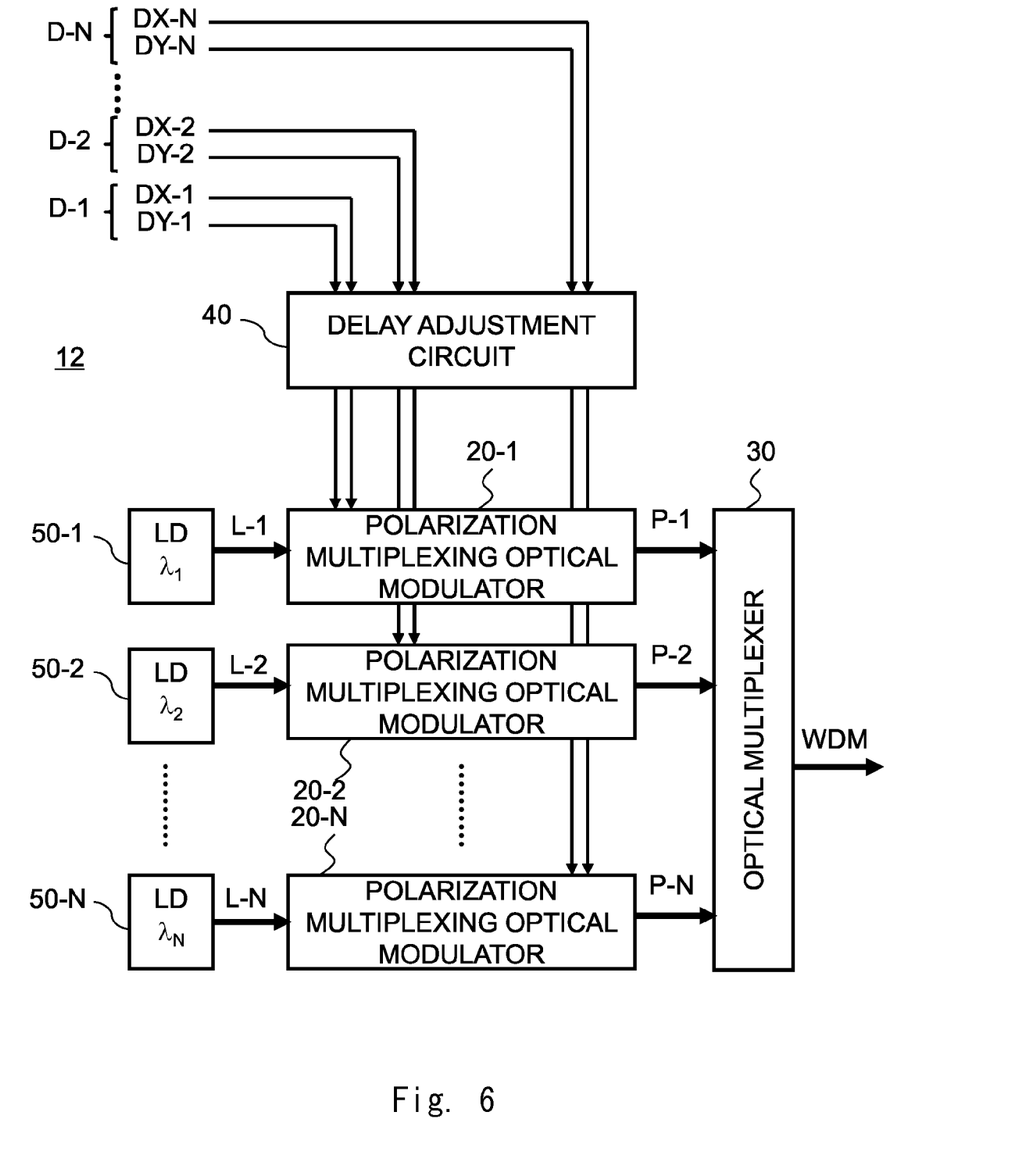
FIG. 6 is a block diagram showing a wavelength division multiplexing optical transmission apparatus according to a second exemplary embodiment.

Referring to FIG. 6, a wavelength division multiplexing optical transmission apparatus 12 according to the second exemplary embodiment includes laser diodes 50-1 to 50-N, polarization multiplexing optical modulators 20-1 to 20-N, a polarization-maintaining optical multiplexer 30, and a delay adjustment circuit 40. The polarization multiplexing optical modulators 20-1 to 20-N respectively correspond to the polarization multiplexed optical modulation units 2-1 to 2-N according to the first exemplary embodiment. The polarization-maintaining optical multiplexer 30 corresponds to the polarization-maintaining optical multiplexing unit 3 according to the first exemplary embodiment. The delay adjustment circuit 40 corresponds to the delay adjustment unit 4 according to the first exemplary embodiment.

The delay adjustment circuit 40 adjusts a delay time in data signal groups D-1 to D-N. The data signal groups D-1 to D-N each include a data signal for modulating X-polarization and a data signal for modulating Y-polarization. For example, the data signal group D-1 includes a data signal DX-1 for modulating X-polarization and a data signal DY-1 for modulating Y-polarization. The laser diodes 50-1 to 50-N respectively output laser diode output light beams L-1 to L-N which have wavelengths $\lambda_1$ to $\lambda_N$, respectively. The polarization multiplexing optical modulators 20-1 to 20-N respectively modulate the laser diode output light beams L-1 to L-N based on the data signal groups D-1 to D-N to generate the polarization multiplexed optical modulation signals P-1 to P-N. The polarization-maintaining optical multiplexer 30 multiplexes the wavelengths of the polarization multiplexed optical modulation signals P-1 to P-N in the state where the polarization states of the polarization multiplexed optical modulation signals P-1 to P-N are managed, to thereby generate the wavelength multiplexed optical signal WDM. The wavelength division multiplexing optical transmission apparatus 12 outputs the wavelength multiplexed optical signal WDM to an optical fiber transmission line (not shown).

Figure 7:
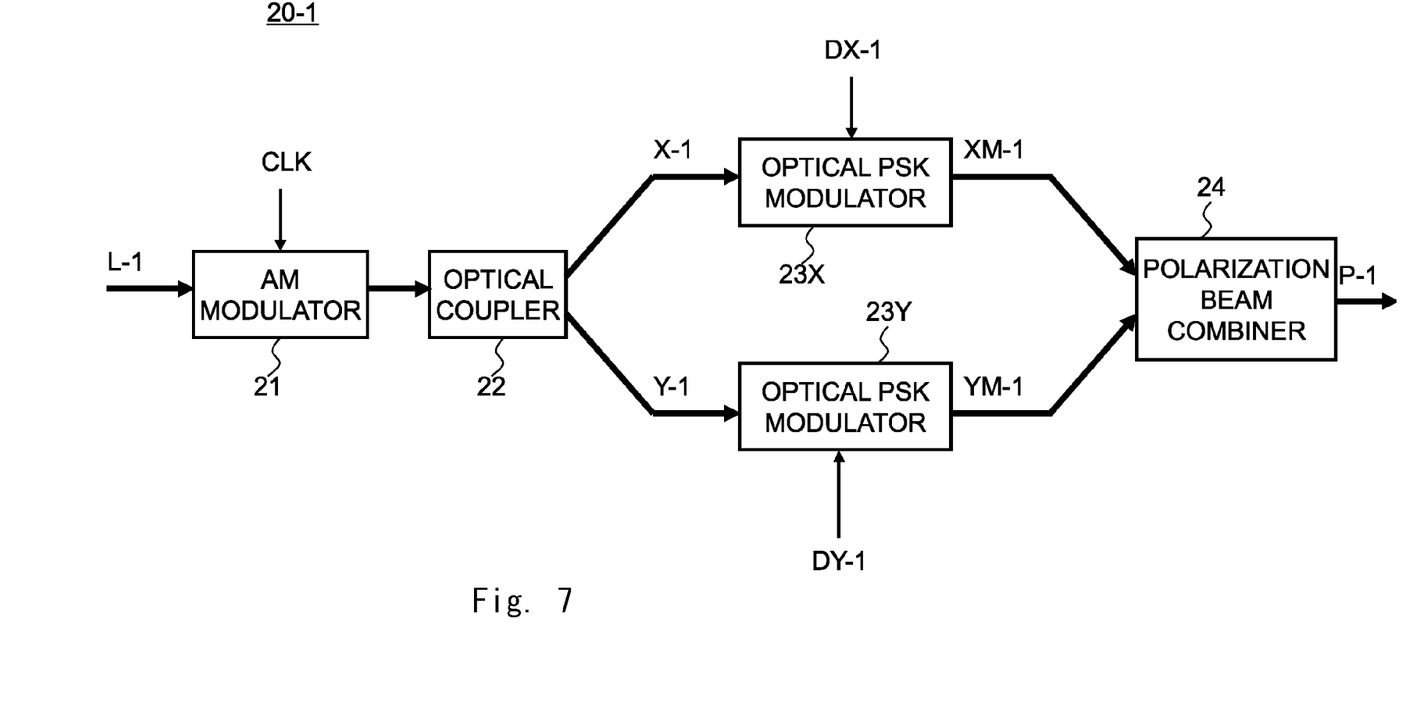
FIG. 7 is a block diagram showing a polarization multiplexing optical modulator included in the wavelength division multiplexing optical transmission apparatus according to the second exemplary embodiment.

Referring to FIG. 7, the polarization multiplexing optical modulator 20-1 will be described in detail. The polarization multiplexing optical modulator 20-1 includes an amplitude modulator (AM modulator) 21, an optical coupler 22, optical phase shift keying modulators (optical PSK modulators) 23X and 23Y, and a polarization beam combiner 24. The optical PSK modulator 23X is also referred to as "X-polarization modulator 23X", and the optical PSK modulator 23Y is also referred to as "Y-polarization modulator 23Y". Note that the polarization multiplexing optical modulators 20-2 to 20-N are configured in the same manner as the polarization multiplexing optical modulator 20-1.

The AM modulator 21 performs amplitude modulation on the laser diode output light beam L-1 based on a clock signal CLK having the same frequency as the baud rate of the data signal group D-1. The optical coupler 22 splits the laser diode output light beam L-1, which has been subjected to amplitude modulation, into an X-polarization X-1 and a Y-polarization Y-1. The optical PSK modulator 23X modulates the X-polarization X-1 based on the data signal DX-1 of the data signal group D-1, to thereby generate an X-polarization modulation signal XM-1. The optical PSK modulator 23Y modulates the Y-polarization Y-1 based on the data signal DY-1 of the data signal group D-1, to thereby generate a Y-polarization modulation signal YM-1. The polarization beam combiner 24 performs polarization multiplexing of the X-polarization modulation signal XM-1 and the Y-polarization modulation signal YM-1 so that they are brought into an orthogonal polarization state, to thereby generate the polarization multiplexed optical modulation signal P-1.

The delay adjustment circuit 40 adjusts a delay time in the data signal groups D-1 to D-N in such a manner that the light intensities of signals having adjacent wavelengths among the polarization multiplexed optical modulation signals P-1 to P-N in the wavelength multiplexed optical signal WDM vary inversely with respect to each other. For example, the delay adjustment circuit 40 imparts a time shift of T/2 bits between each of data signal groups D-1, D-3, and . . . for generating polarization multiplexed optical modulation signals P-1, P-3, and . . . , respectively, which have odd-numbered wavelengths, and each of data signal groups D-2, D-4, and . . . for generating polarization multiplexed optical modulation signals P-2, P-4, and . . . , respectively, which have even-numbered wavelengths, counted in an ascending order of the polarization multiplexed optical modulation signals P-1 to P-N. In this case, the polarization multiplexed optical modulation signals P-1 to P-N in the wavelength multiplexed optical signal WDM output from the wavelength division multiplexing optical transmission apparatus 12 are in the state shown in FIG. 3.

Alternatively, the delay adjustment circuit 40 adjusts a delay time in the data signal groups D-1 to D-N in such a manner that the polarization multiplexed optical modulation signals P-1 to P-N in the wavelength multiplexed optical signal WDM become polarization multiplexed optical modulation signals of the polarization bit interleaving system and light intensities of components having the same polarization plane of the signals having adjacent wavelengths among the polarization multiplexed optical modulation signals P-1 to P-N in the wavelength multiplexed optical signal WDM vary inversely with respect to each other. For example, the delay adjustment circuit 40 imparts a time shift of T/2 bits between each of the data signals DY-1, DY-3, and . . . for modulating Y-polarization, which are included in the data signal groups D-1, D-13, and . . . , respectively, and each of the data signals DY-2, DY-4, and . . . for modulating Y-polarization, which are included in the data signal groups D-12, D-14, and . . . , respectively. Further, the delay adjustment circuit 40 imparts a time shift of T/2 bits between the data signal for modulating X-polarization and the data signal for modulating Y-polarization in each of the data signal groups D-1 to D-N. In this case, the polarization multiplexed optical modulation signals P-1 to P-N in the wavelength multiplexed optical signal WDM output from the wavelength division multiplexing optical transmission apparatus 12 are in the state shown in FIG. 5.

Third Exemplary Embodiment

Next, a wavelength division multiplexing optical transmission apparatus and a wavelength division multiplexing optical transmission method according to a third exemplary embodiment will be described.

Hereinafter, features of the third exemplary embodiment that are common to those of the first and second exemplary embodiments and features of the third exemplary embodiment that are obvious from the first and second exemplary embodiments will be omitted as necessary.

Figure 8:
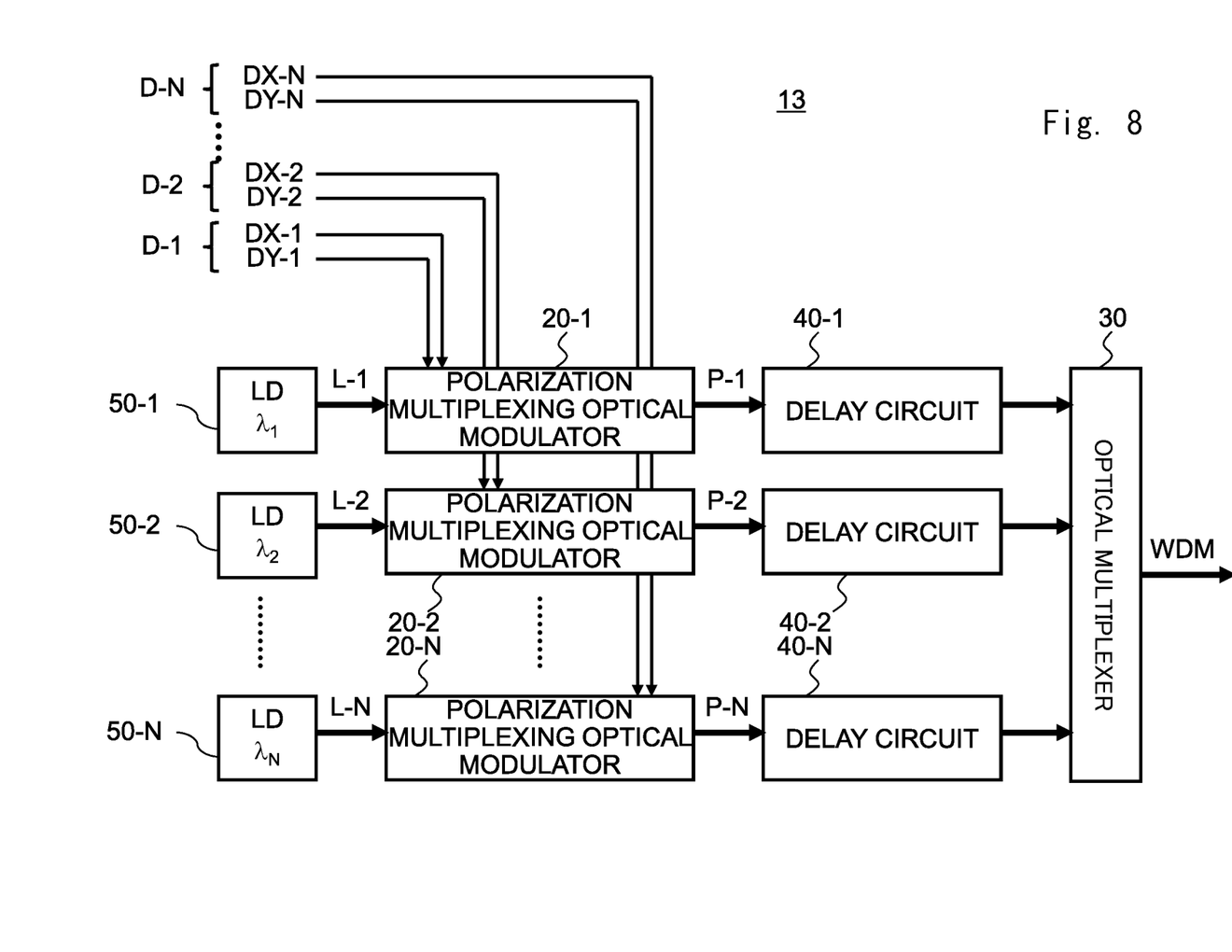
FIG. 8 is a block diagram showing a wavelength division multiplexing optical transmission apparatus according to a third exemplary embodiment.

Referring to FIG. 8, a wavelength division multiplexing optical transmission apparatus 13 according to the third exemplary embodiment differs from the wavelength division multiplexing optical transmission apparatus 12 according to the second exemplary embodiment in that delay circuits 40-1 to 40-N are provided in place of the delay adjustment circuit 40. The delay circuits 40-1 to 40-N correspond to the delay adjustment unit 4 according to the first exemplary embodiment. The delay circuits 40-1 to 40-N are disposed between the polarization-maintaining optical multiplexer 30 and the polarization multiplexing optical modulators 20-1 to 20-N. For example, the delay circuit 40-1 is disposed between the polarization-maintaining optical multiplexer 30 and the polarization multiplexing optical modulator 20-1. The delay circuits 40-1 to 40-N are also referred to as "inter-wavelength delay circuits 40-1 to 40-N", respectively.

The delay circuits 40-1 to 40-N adjust delay times in the respective polarization multiplexed optical modulation signals P-1 to P-N in such a manner that light intensities of signals having adjacent wavelengths among the polarization multiplexed optical modulation signals P-1 to P-N in the wavelength multiplexed optical signal WDM vary inversely with respect to each other. For example, the delay circuits 40-1 to 40-N each impart a time shift of T/2 bits between each of the polarization multiplexed optical modulation signals P-1, P-3, and . . . , which have odd-numbered wavelengths, and each of the polarization multiplexed optical modulation signals P-2, P-4, and . . . , which have even-numbered wavelengths, counted in an ascending order of the polarization multiplexed optical modulation signals P-1 to P-N. The polarization-maintaining optical multiplexer 30 multiplexes the wavelengths of the polarization multiplexed optical modulation signals P-1 to P-N in which delay times are adjusted by the delay circuits 40-1 to 40-N, respectively, thereby generating the wavelength multiplexed optical signal WDM. In this case, the polarization multiplexed optical modulation signals P-1 to P-N in the wavelength multiplexed optical signal WDM output from the wavelength division multiplexing optical transmission apparatus 13 are in the state shown in FIG. 3.

Fourth Exemplary Embodiment

Next, a wavelength division multiplexing optical transmission apparatus and a wavelength division multiplexing optical transmission method according to a fourth exemplary embodiment will be described. Hereinafter, features of the fourth exemplary embodiment that are common to those of the first to third exemplary embodiments and features of the fourth exemplary embodiment that are obvious from the first to third exemplary embodiments will be omitted as necessary.

Figure 9:
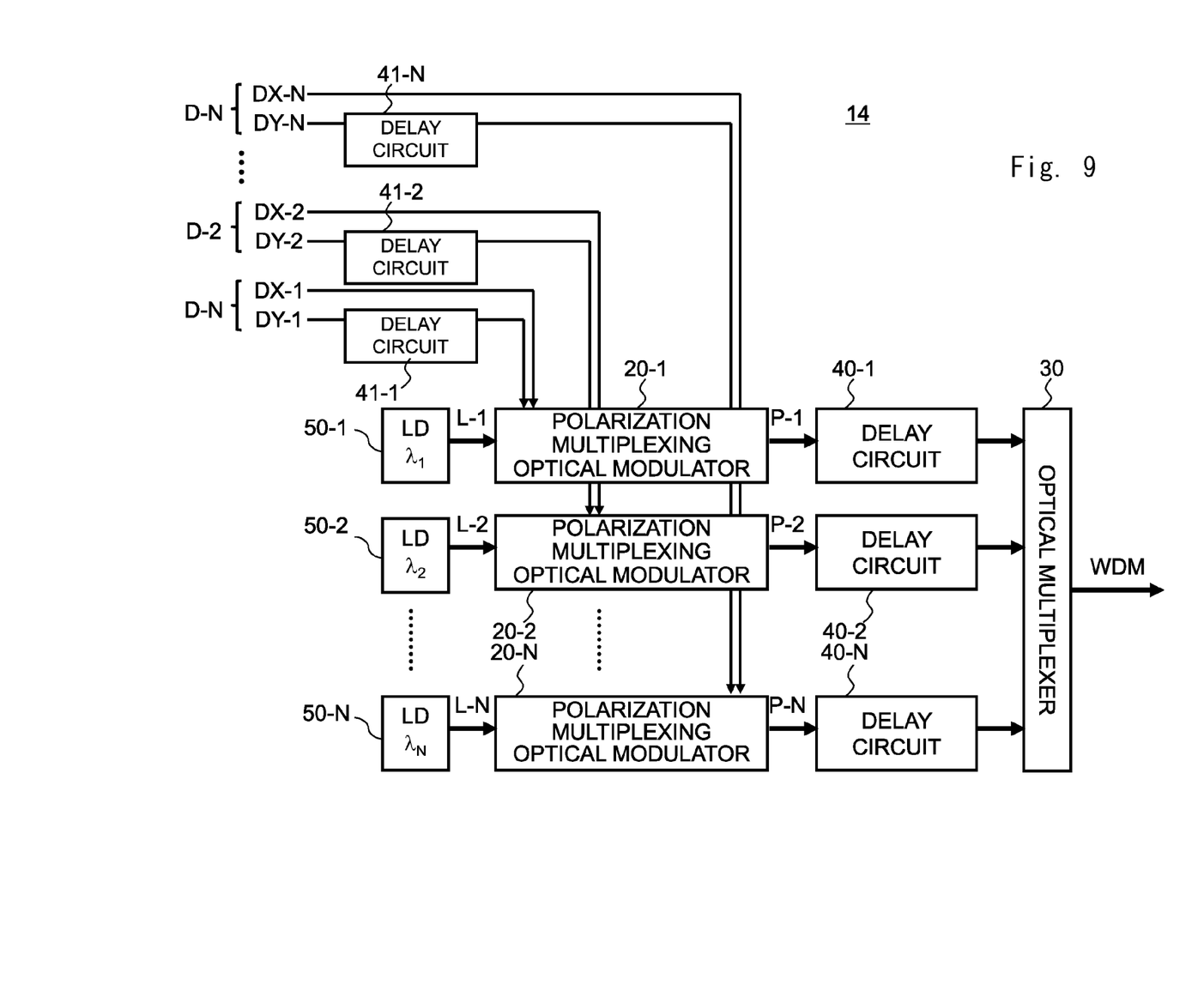
FIG. 9 is a block diagram showing a wavelength division multiplexing optical transmission apparatus according to a fourth exemplary embodiment.

Referring to FIG. 9, a wavelength division multiplexing optical transmission apparatus 14 according to the fourth exemplary embodiment differs from the wavelength division multiplexing optical transmission apparatus 13 according to the third exemplary embodiment in that delay circuits 41-1 to 41-N are added. The delay circuits 41-1 to 41-N are also referred to as "inter-polarization delay circuits 41-1 to 41-N", respectively. The delay circuits 40-1 to 40-N and 41-1 to 41-N correspond to the delay adjustment unit 4 according to the first exemplary embodiment.

The delay circuits 41-1 to 41-N each adjust a delay time between a data signal for modulating X-polarization and a data signal for modulating Y-polarization in each of the data signal groups D-1 to D-N in such a manner that the polarization multiplexed optical modulation signals P-1 to P-N in the wavelength multiplexed optical signal WDM become polarization multiplexed optical modulation signals of the polarization bit interleaving system. Specifically, the delay circuits 41-1 to 41-N each impart a delay time of T/2 bits to one of the data signal for modulating X-polarization and the data signal for modulating Y-polarization in each of the data signal groups D-1 to D-N. For example, the delay circuit 41-1 imparts a delay time of T/2 bits to the data signal DY-1. In this case, the polarization multiplexed optical modulation signals P-1 to P-N in the wavelength multiplexed optical signal WDM output from the wavelength division multiplexing optical transmission apparatus 14 are in the state shown in FIG. 5.

Fifth Exemplary Embodiment

Next, a wavelength division multiplexing optical transmission apparatus and a wavelength division multiplexing optical transmission method according to a fifth exemplary embodiment will be described. Hereinafter, features of the fifth exemplary embodiment that are common to those of the first to third exemplary embodiments and features of the fifth exemplary embodiment that are obvious from the first to third exemplary embodiments will be omitted as necessary.

Figure 10:
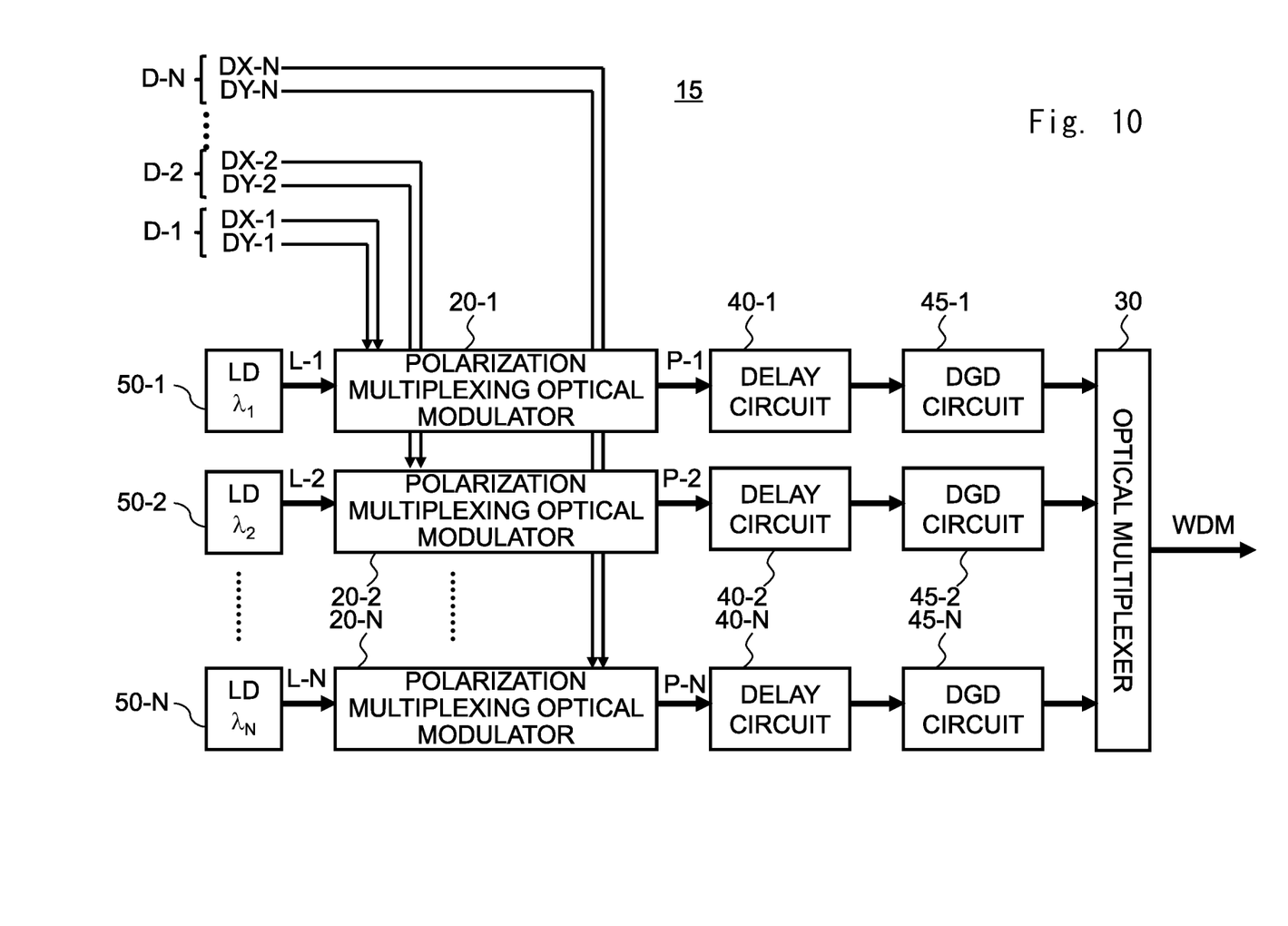
FIG. 10 is a block diagram showing a wavelength division multiplexing optical transmission apparatus according to a fifth exemplary embodiment.

Referring to FIG. 10, a wavelength division multiplexing optical transmission apparatus 15 according to the fifth exemplary embodiment differs from the wavelength division multiplexing optical transmission apparatus 13 according to the third exemplary embodiment in that inter-polarization delay circuits (DGD circuits) 45-1 to 45-N are added. The delay circuits 40-1 to 40-N and the DGD circuits 45-1 to 45-N correspond to the delay adjustment unit 4 according to the first exemplary embodiment. The DGD circuits 45-1 to 45-N are disposed between the polarization-maintaining optical multiplexer 30 and the delay circuits 40-1 to 40-N. For example, the DGD circuit 45-1 is disposed between the polarization-maintaining optical multiplexer 30 and the delay circuit 40-1.

The DGD circuits 45-1 to 45-N each adjust a delay time between the polarizations of the polarization multiplexed optical modulation signals P-1 to P-N, in which delay times are adjusted by the delay circuits 40-1 to 40-N, respectively, in such a manner that signals having adjacent wavelengths among the polarization multiplexed optical modulation signals P-1 to P-N in the wavelength multiplexed optical signal WDM vary inversely with respect to each other. For example, the DGD circuit 45-1 imparts a delay time of T-2 bits between the X-polarization and the Y-polarization of the polarization multiplexed optical modulation signal P-1 output from the delay circuit 40-1. The polarization-maintaining optical multiplexer 30 multiplexes the wavelengths of the polarization multiplexed optical modulation signals P-1 to P-N in which delay times between the polarizations are adjusted by the DGD circuits 45-1 to 45-N, respectively, thereby generating the wavelength multiplexed optical signal WDM. In this case, the polarization multiplexed optical modulation signals P-1 to P-N in the wavelength multiplexed optical signal WDM output from the wavelength division multiplexing optical transmission apparatus 14 are in the state shown in FIG. 5.

Sixth Exemplary Embodiment

Next, a wavelength division multiplexing optical transmission apparatus and a wavelength division multiplexing optical transmission method according to a sixth exemplary embodiment will be described. Hereinafter, features of the sixth exemplary embodiment that are common to those of the first to fifth exemplary embodiments and features of the sixth exemplary embodiment that are obvious from the first to fifth exemplary embodiments will be omitted as necessary.

The wavelength division multiplexing optical transmission apparatus according to the sixth exemplary embodiment differs from the wavelength division multiplexing optical transmission apparatuses 12 to 15 according to the second to fifth exemplary embodiments in the following points. The data signal groups D-1 to D-N each include an in-phase channel data signal (I-channel data signal) and a quadrature channel data signal (Q-channel data signal) for modulating X-polarization, and also include an I-channel data signal and a Q-channel data signal for modulating Y-polarization. Since the data signal groups D-1 to D-N each include four-channel data signals, the polarization multiplexing optical modulators 20-1 to 20-N have different configurations.

Figure 11:
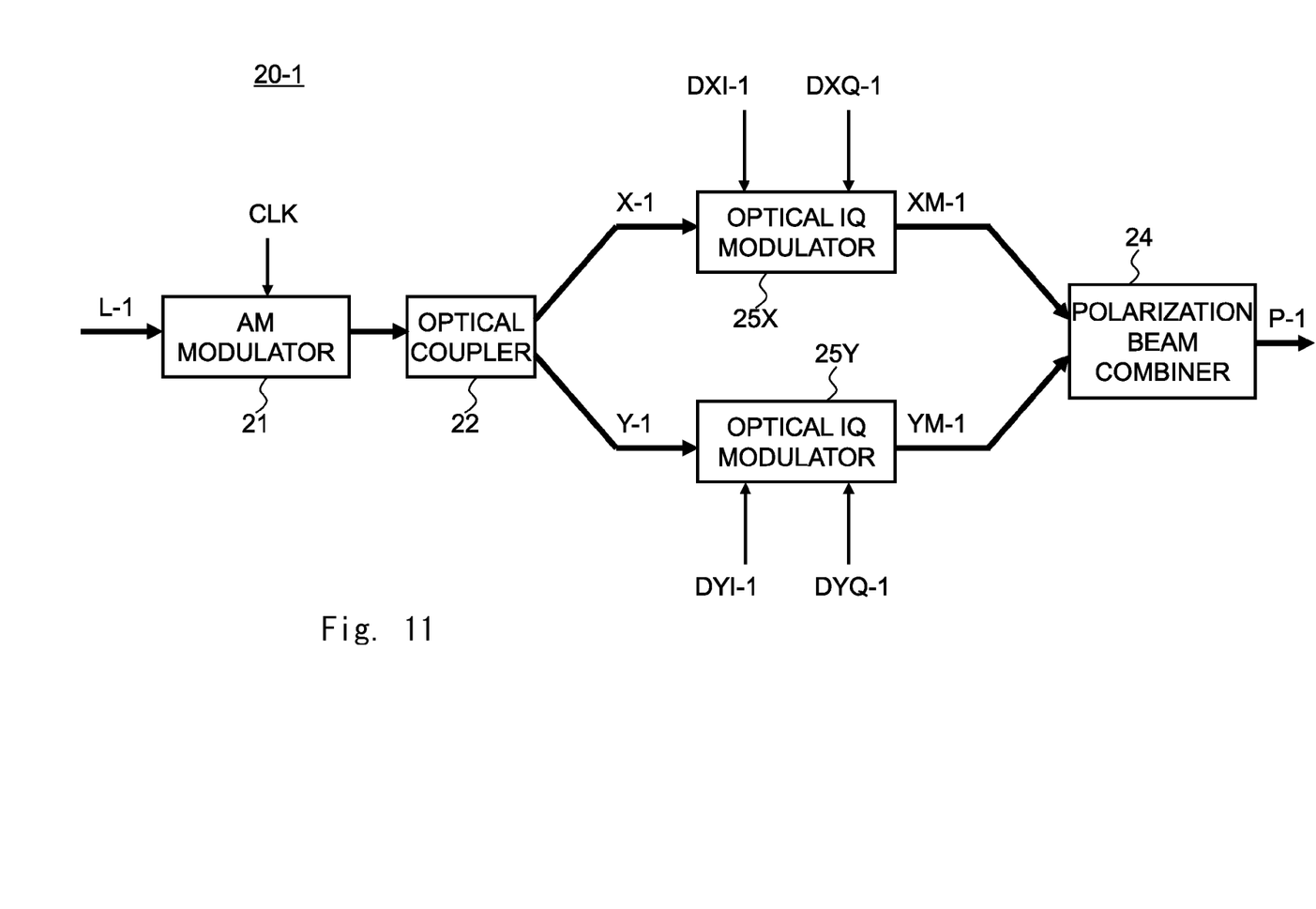
FIG. 11 is a block diagram showing a polarization multiplexing optical modulator included in a wavelength division multiplexing optical transmission apparatus according to a sixth exemplary embodiment.

Referring to FIG. 11, the polarization multiplexing optical modulator 20-1 according to this exemplary embodiment will be described in detail. The polarization multiplexing optical modulator 20-1 according to this exemplary embodiment differs from the polarization multiplexing optical modulator 20-1 according to the second to fifth exemplary embodiments in that optical quadrature modulators (optical IQ modulators) 25X and 25Y are provided in place of the optical PSK modulators 23X and 23Y. The optical IQ modulator 25 is also referred to as "X-polarization modulator 25X", and the optical IQ modulator 25Y is also referred to as "Y-polarization modulator 25Y". Note that the polarization multiplexing optical modulators 20-2 to 20-N according to this exemplary embodiment are configured in the same manner as the polarization multiplexing optical modulator 20-1 according to this exemplary embodiment.

The data signal group D-1 includes an I-channel data signal DXI-1 and a Q-channel data signal DXQ-1 for modulating X-polarization, and also includes an I-channel data signal DYI-1 and a Q-channel data signal DYQ-1 for modulating Y-polarization. The optical IQ modulator 25X modulates the X-polarization X-1 based on the I-channel data signal DXI-1 and the Q-channel data signal DXQ-1, thereby generating the X-polarization modulation signal XM-1. The optical IQ modulator 25Y modulates the Y-polarization Y-1 based on the I-channel data signal DYI-1 and the Q-channel data signal DYQ-1, thereby generating the Y-polarization modulation signal YM-1.

An operation of the delay adjustment circuit 40 according to this exemplary embodiment will be described in which the delay adjustment circuit 40 adjusts a delay time in each of the data signal groups D-1 to D-N in such a manner that the polarization multiplexed optical modulation signals P-1 to P-N in the wavelength multiplexed optical signal WDM become polarization multiplexed optical modulation signals of the polarization bit interleaving system and the light intensities of components having the same polarization plane of the signals having adjacent wavelengths among the polarization multiplexed optical modulation signals P-1 to P-N in the wavelength multiplexed optical signal WDM vary inversely with respect to each other. For example, the delay adjustment circuit 40 imparts a time shift of T/2 bits between each of I- and Q-channel data signals DYI-1, DYQ-1, DYI-3, DYQ-3, and . . . for modulating Y-polarization, which are included in the data signal groups D-1, D-3, and . . . , respectively, and each of I- and Q-channel data signals DYI-2, DYQ-2, DYI-4, DYQ-4, and . . . for modulating Y-polarization, which are included in the data signal groups D-2, D-4, and . . . , respectively. Further, the delay adjustment circuit 40 imparts a time shift of T/2 bits between each of I- and Q-channel data signals for modulating X-polarization and each of I- and Q-channel data signals for modulating Y-polarization in each of the data signal groups D-1 to D-N.

The delay circuits 41-1 to 41-N according to this exemplary embodiment each adjust a delay time between each of I- and Q-channel data signals for modulating X-polarization and each of I- and Q-channel data signals for modulating Y-polarization in each of the data signal groups D-1 to D-N in such a manner that the polarization multiplexed optical modulation signals P-1 to P-N in the wavelength multiplexed optical signal WDM become polarization multiplexed optical modulation signals of the polarization bit interleaving system. Specifically, the delay circuits 41-1 to 41-N each impart a delay time of T/2 bits to one of the data signal for modulating X-polarization and the data signal for modulating Y-polarization in each of the data signal groups D-1 to D-N. For example, the delay circuit 41-1 imparts a delay time of T/2 bits to each of the I-channel data signal DYI-1 and the Q-channel data signal DYQ-1.

Note that the present invention is not limited to the above exemplary embodiments and can be modified as appropriate without departing from the scope of the invention. For example, in the above exemplary embodiments, the AM modulator 21 modulates the laser diode output light beam L-1 into an RZ (Return to Zero) signal. However, when the laser diode output light beam is instead modulated into an NRZ (Non Return to Zero) signal, the same effects can be obtained. In this case, the AM modulator 21 is not necessary.

The present invention has been described above with reference to exemplary embodiments. However, the present invention is not limited to the above exemplary embodiments. The configuration and details of the present invention can be modified in various ways which can be understood by those skilled in the art within the scope of the invention.

This application is based upon and claims the benefit of priority from Japanese patent application No. 2013-035456, filed on Feb. 26, 2013, the disclosure of which is incorporated herein in its entirety by reference.

REFERENCE SIGNS LIST 11-15 WAVELENGTH DIVISION MULTIPLEXING OPTICAL TRANSMISSION APPARATUS;
2-1-2-N POLARIZATION MULTIPLEXED OPTICAL MODULATION UNIT;
3 POLARIZATION-MAINTAINING OPTICAL MULTIPLEXING UNIT;
4 DELAY ADJUSTMENT UNIT;
20-1-20-N POLARIZATION MULTIPLEXING OPTICAL MODULATOR;
22 OPTICAL COUPLER;
23X, 23Y OPTICAL PSK MODULATOR;
24 POLARIZATION BEAM COMBINER;
25X, 25Y OPTICAL IQ MODULATOR;
30 POLARIZATION-MAINTAINING OPTICAL MULTIPLEXER;
40 DELAY ADJUSTMENT CIRCUIT;
40-1-40-N, 41-1 to 41-N DELAY CIRCUIT;
45-1-45-N DGD CIRCUIT;
50-1-50-N LASER DIODE;
D-1-D-N DATA SIGNAL GROUP;
DX-1-DX-N, DY-1-DY-N, DXI-1, DXQ-1, DYI-1, DYQ-1 DATA SIGNAL;

L-1-L-N LASER DIODE OUTPUT LIGHT;
X-1 X-POLARIZATION;
Y-1 Y-POLARIZATION;
XM-1 X-POLARIZATION MODULATION SIGNAL;
YM-1 Y-POLARIZATION MODULATION SIGNAL;
P-1-P-N POLARIZATION MULTIPLEXED OPTICAL MODULATION SIGNAL;
WDM WAVELENGTH MULTIPLEXED OPTICAL SIGNAL

The invention claimed is:

1. A wavelength division multiplexing optical transmission apparatus comprising:
    a plurality of polarization multiplexing optical modulation units that generate a plurality of polarization multiplexed optimodulation signals having different wavelengths;
    a polarization-maintaining optical multiplexing unit that multiplexes the wavelengths of the plurality of polarization multiplexed optical modulation signals to generate a wavelength multiplexed optical signal; and
    a delay adjustment unit that adjusts a delay in such a manner that light intensities of polarization multiplexed optical modulation signals having adjacent wavelengths in the wavelength multiplexed optical signal vary inversely with respect to each other, wherein:
    the delay adjustment unit includes a plurality of delay circuits disposed between the polarization-maintaining optical multiplexing unit and the plurality of polarization multiplexing optical modulation units, and
    the plurality of delay circuits respectively adjust delay times of the plurality of polarization multiplexed optical modulation signals.

2. The wavelength division multiplexing optical transmission apparatus according to claim 1, wherein:
    the delay adjustment unit imparts a time shift of T/2 bits between polarization multiplexed optical modulation signals having adjacent wavelengths in the wavelength multiplexed optical signal, and
    the T represents a one-bit time slot at a symbol rate.

3. A wavelength division multiplexing optical transmission apparatus, comprising:
    a plurality of polarization multiplexing optical modulation units that generate a plurality of polarization multiplexed optical modulation signals having different wavelengths;
    a polarization-maintaining optical multiplexin unit that multiplexes the wavelengths of the plurality of polarization multiplexed optical modulation signals to generate a wavelength multiplexed optical signal; and
    a delay adjustment unit that adjusts a delay in such a manner that light intensities of polarization multiplexed optical modulation signals having adjacent wavelengths in the wavelength multiplexed optical signal vary inversely with respect to each other, wherein:
    the delay adjustment unit adjusts a delay in such a manner that the plurality of polarization multiplexed optical modulation signals in the wavelength multiplexed optical signal become polarization multiplexed optical modulation signals of a polarization bit interleaving system and light intensities of components having the same polarization plane of polarization multiplexed optical modulation signals having adjacent wavelengths in the wavelength multiplexed optical signal vary inversely with respect to each other,
    wherein the plurality of polarization multiplexing optical modulation units each include:
        an optical coupler that splits output light from a laser diode into X-polarization and Y-polarization;
        an X-polarization modulator that generates an X-polarization modulation signal based on the X-polarization and an X-polarization data signal;
        a Y-polarization modulator that generates a Y-polarization modulation signal based on the Y-polarization and a Y-polarization data signal; and
        a polarization beam combiner that performs polarization multiplexing of the X-polarization modulation signal and the Y-polarization modulation signal and generates a polarization multiplexed optical modulation signal as one of the plurality of polarization multiplexed optical modulation signals, and
    the delay adjustment unit includes:
        an inter-wavelength delay circuit that adjusts a delay time in the plurality of polarization multiplexed optical modulation signals; and
        an inter-polarization delay circuit that adjusts a delay time between the X-polarization data signal and the Y-polarization data signal.

4. A wavelength division multiplexing optical transmission apparatus, comprising:
    a plurality of polarization multiplexing, optical modulation units that generate a plurality of polarization multiplexed optical modulation signals having different wavelengths;
    a polarization-maintaining optical multiplexing unit that multiplexes the wavelengths of the plurality of polarization multiplexed optical modulation signals to generate a wavelength multiplexed optical signal; and
    a delay adjustment unit that adjusts a delay in such a manner that light intensities of polarization multiplexed optical modulation signals having adjacent wavelengths in the wavelength multiplexed optical signal vary inversely with respect to each other, wherein:
    the delay adjustment unit adjusts a delay in such a manner that the plurality of polarization multiplexed optical modulation signals in the wavelength multiplexed optical signal become polarization multiplexed optical modulation signals of a polarization bit interleaving system and light intensities of components having the same polarization plane of polarization multiplexed optical modulation signals having adjacent wavelengths in the wavelength multiplexed optical signal vary inversely with respect to each other, and
    the delay adjustment unit includes:
        a plurality of inter-wavelength delay circuits that adjust delay times in the plurality of polarization multiplexed optical modulation signals, respectively; and
        a plurality of inter-polarization delay circuits that adjust delay times in the plurality of polarization multiplexed optical modulation signals, respectively.

* * * * *

UNITED STATES PATENT AND TRADEMARK OFFICE
CERTIFICATE OF CORRECTION

PATENT NO. : 9,680,598 B2
APPLICATION NO. : 14/770197
DATED : June 13, 2017
INVENTOR(S) : Inada It is certified that error appears in the above-identified patent and that said Letters Patent is hereby corrected as shown below:

In the Claims

Claim 3, Column 13, Line 46, "multiplexin" should read as --multiplexing--.

Signed and Sealed this
Twelfth Day of December, 2017

Joseph Matal
*Performing the Functions and Duties of the
Under Secretary of Commerce for Intellectual Property and
Director of the United States Patent and Trademark Office*